June 13, 1961  F. A. PAMPEL ET AL  2,988,202
SKIRT PLATES FOR BELT CONVEYOR
Filed Oct. 25, 1956
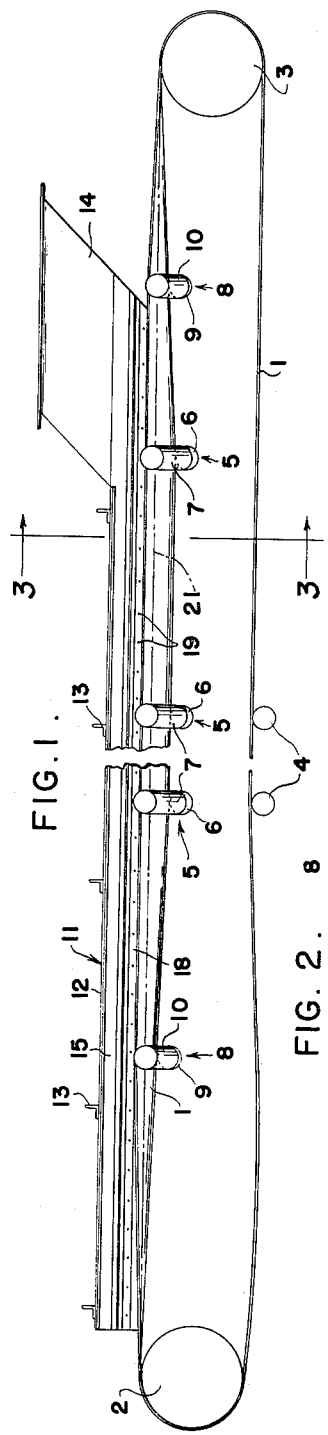
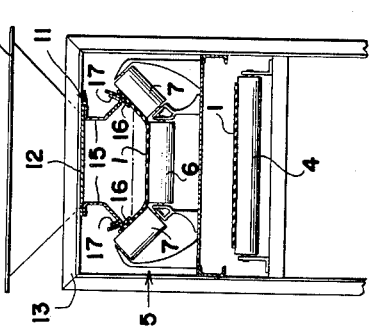
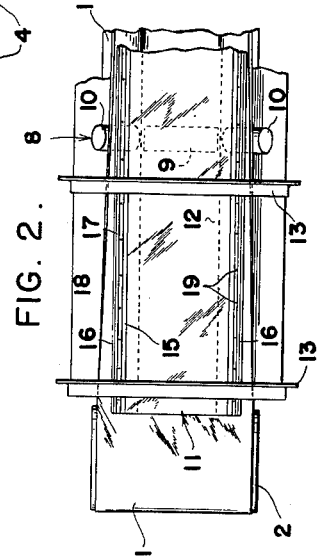
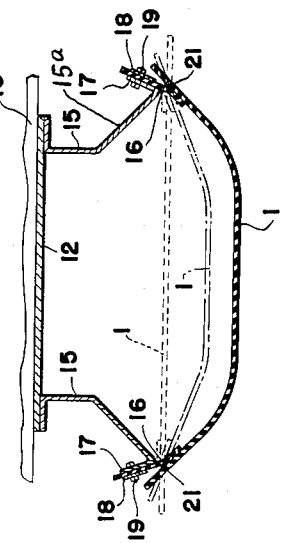
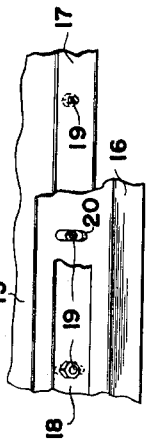
*INVENTORS*
FRED A. PAMPEL
FREDERICK A. KELSALL
BY
*Ernst W. Schultz*
ATTORNEY

United States Patent Office 2,988,202
Patented June 13, 1961

2,988,202
SKIRT PLATES FOR BELT CONVEYOR
Fred A. Pampel, Milwaukee, and Frederick A. Kelsall, Wauwatosa, Wis., assignors to Chain Belt Company, Milwaukee, Wis., a corporation of Wisconsin
Filed Oct. 25, 1956, Ser. No. 618,404
2 Claims. (Cl. 198—204)

This invention relates to belt conveyors and particularly to the skirt plates therefor which serve to retain the conveyed bulk material in the trough of the belt.

According to the invention, the skirt plate is inclined to extend over and clear of the material on the belt at the approximate angle of repose of the material so that the material is retained ordinarily with no interference to its movement with the belt. The skirt plate seal, comprising a flat strip of flexible material is carried by the skirt plate in contact with the face of the belt to form a closure along a line near the edge of the belt and generally removed from the material. The line referred to is proximate to the line of transition about which the sides of the belt twist in forming the trough so that by twisting the sealing strips to correspond with that of the belt, an effective seal is provided throughout the length thereof and the strips may be carried by skirt plates in a straight line and clear of the material.

A principal object of the invention is to retain the material on the belt with less interference with the movement of the material.

Another object of the invention is to provide a skirt plate which is inclined over the belt at an angle approximately corresponding to the angle of repose of the material so that the material is allowed or caused to assume a natural position immediately upon such loading and so that the material is allowed or caused to assume a natural position immediately upon such loading and so that the material, particularly nearer to the sides of the belt, will assume the speed of the belt with a minimum of agitation.

Another object of the invention is to provide an effective seal between the skirt plate and the belt which accommodates the twist of the belt towards the ends of the trough so that the skirt plate and the seal is easily installed to retain or completely cover the material and so that the same may comprise straight members extending the length of the conveyor.

Another object of the invention is to facilitate the adjustment of the sealing member and its replacement as may be required.

Another object is to locate the seal near the outer edges of the belt and removed from the material being handled or conveyed so that the seal is not subject to material working beneath the same or between the sealing strip and the belt.

The drawings furnished herewith illustrate the best mode of carrying out the invention as presently contemplated and set forth hereinafter.

In the drawings:

FIGURE 1 is a fragmentary side elevation of a conveyor belt and of a cover therefor with a loading hopper at one end thereof. The idlers supporting the working and return runs of the belt and the head and foot pulleys are shown diagrammatically;

FIG. 2 is a plan view of the head end of the conveyor belt and cover shown in FIG. 1;

FIG. 3 is a vertical transverse section taken on line 3—3 of FIG. 1 and showing the end of the loading hopper in elevation;

FIG. 4 is an enlarged transverse section through the belt and cover and with contours of the belt in several transition stages shown in dotted lines; and FIG. 5 is an enlarged side elevation of a portion of the lower part of the skirt plate forming a part of the cover with parts thereof broken away and sectioned to show the adjustment allowed the sealing strip.

The conveyor shown in the drawings includes the flexible belt 1 and the head and foot pulleys 2 and 3, respectively. Belt 1 is flat in passing around pulleys 2 and 3 and over the idler rolls 4 supporting the lower, return run of the belt.

The series of idlers, 5 which support the upper, working run of belt 1 in the form of a trough extending the major length of the conveyor comprise the rolls 6 and 7. Each of rolls 6 is disposed between two corresponding, inclined rolls 7 to support the belt with the edges turned up to form the trough. A sufficient length of belt 1 between pulleys 2 and 3 and the troughing idlers 5 is provided so that the edges of belt 1 are turned up gradually to avoid undue stresses in the belt. The lengths of the belt in transition to and from the shape of the trough are supported by the transition idlers 8 which comprise the center rolls 9 and the outer rolls 10 having inclined axes intermediate that of the rolls 7.

Idlers 8 support belt 1 so that the transition of the belt to the form of the trough is gradual and easy. In such transition the center of the belt is lowered while the edges of the belt are raised and necessarily drawn together slightly. The contour which the belt assumes includes opposite twists of the parts of the belt forming the sides of the trough and a corresponding transition of the belt from the trough to a flat state is similarly provided for passing over pulley 2.

The cover 11 extending substantially the length of the conveyor includes the top plate 12 and is suitably supported at intervals over belt 1 as by frames 13. Cover 11 is of a width generally corresponding to that of the lower section of the trough of belt 1 and is open at the ends thereof near pulley 3 to receive the material from the hopper 14.

The skirt plates 15 forming the sides of cover 11 extend downwardly and have lower portions 15a provided with the flexible edging 16. Lower portions 15a extend upwardly and inwardly from the edges of the belt and the upper portions of skirt plates 15 are vertical and spaced to form a throat for hopper 14 with given horizontal dimensions according to the size of the belt and the length of hopper 14. The throat serves to give the material a more straight downward path onto the belt.

The edging 16 extends along the lower dimensions of both plates 15 with a flat contact with the moving belt 1 to form a seal therebetween. Each edging 16 comprises a flat length of rubber or other flexible material secured with the upper portion extending the length thereof between the flange 17 formed integrally with the corresponding skirt plate 15 and the metal retaining strip 18. The edging 16 is tightly secured between flanges 17 and retaining strips 18 by the bolts 19 which extend therethrough and through the slots 20 in the edging whereby the latter is allowed limited vertical adjustment to accommodate the slight sag which occurs in all belts between the supporting rolls. Flanges 17 may be vertical or may be inclined somewhat with the upper edge disposed outwardly respecting the belt so that the lower free portion of the edging will more readily engage the belt with a lesser bend.

According to the invention, belt 1 is supported by idlers 5 and 8 so that the portions of the belt forming the sides of the trough turn or twist around straight transition lines 21 located proximate to the edging 16 of the skirt plates and the edging is located with respect to the throat at hopper 14 as formed by plates 15 so that it is removed from the material piling on the belt.

While the portion of edging 16 clamped between the underside of flange 17 and strip 18 and the same are entirely straight, the free portion of the edging may be similarly turned to conform to that of belt 1 for an effective seal throughout the length of the cover and particularly where the cover extends over the parts of the belt which are in transition to and from the shape of a trough.

The effective seal referred to and the sloped skirt plates allow the material to slump or repose naturally on the belt with no interference.

By eliminating such interference, little or no material reaches the edging to either load or work under the same and the agitation of the material caused by such interfence is likewise eliminated.

Skirt plates 15 may be employed without top plates 12 to merely retain the material on the belt as required. The invention greatly improves the function of the skirt plates which heretofore were necessarily spaced closer together and retarded the movement of the material. Hopper 14 may be located anywhere along the length of the cover or skirts 15 which may extend all the way up to tail pulley 3. Several hoppers, not shown, feeding from different bins, for example, may be employed anywhere along the length of the skirts.

Various modes of carrying out the invention are contemplated as within the scope of the following claims particularly pointing out and distinctly claiming the subject matter which is regarded as the invention.

We claim:

1. In a conveyor including a belt and a series of idlers supporting the upper load-carrying run of the belt to form a trough having inclined sides and a flat central bottom of a given width, a hopper disposed above the belt and having a lower opening located directly above said bottom and approximately the width thereof, skirt plates extending beneath said hopper and above the belt toward the discharge end thereof, said plates having upper vertical portions spaced approximately the width of the trough bottom and having lower portions inclined downwardly and outwardly respecting the belt to the outer upper edges of the belt, and flexible strips secured to the lower margins of said skirts and extending therefrom to engage the belt and form seals between the belt and the skirts, said upper portions of the skirts at said opening of the hopper providing the improved control of the loading of the belt from the hopper wherein the upper portions of the skirts form extensions of the hopper opening and the lower portions limit the material which may be loaded on the strips at the hopper opening and so that the strips are clear of the material carried forward by the belt.

2. In a conveyor including an end pulley, a belt and a series of idlers supporting the upper load-carrying run of the belt to form a trough having inclined sides and a flat central bottom of a given width, said trough being formed about parallel imaginary transition lines from said end pulley and near each edge of the belt, a hopper disposed above the belt and having a lower opening located directly above the said bottom and approximately the width thereof, skirt plates extending beneath said hopper and above the belt toward the discharge end thereof, said plates having upper vertical portions spaced approximately the width of the trough bottom and having lower portions inclined downwardly and outwardly respecting the belt to the outer upper edges of the belt, and flexible strips secured to the lower margins of said skirts and extending therefrom to engage the belt along said transition lines and to form seals between the belt and the skirts, said upper portions of the skirts at said opening of the hopper providing the improved control of the loading of the belt from the hopper wherein the upper portions of the skirts form extensions of the hopper opening and the lower portions limit the loading on the sealing strips so that the material conveyed is fully loaded on the belt between the seals but does not extend onto the strips.

References Cited in the file of this patent

UNITED STATES PATENTS

| 428,346 | Mueller | May 20, 1890 |
| 1,330,709 | Hurt | Feb. 10, 1920 |
| 2,298,472 | Dudley | Oct. 13, 1942 |

FOREIGN PATENTS

| 396,184 | Great Britain | Aug. 3, 1933 |
| 1,084,249 | France | July 7, 1954 |
| 1,097,637 | France | Feb. 23, 1955 |